US010992818B2

(12) United States Patent
Hughes et al.

(10) Patent No.: US 10,992,818 B2
(45) Date of Patent: *Apr. 27, 2021

(54) USAGE TRACKING FOR SOFTWARE AS A SERVICE (SAAS) APPLICATIONS (71) Applicant: Flexera Software LLC, Itasca, IL (US)

(72) Inventors: Paul Hughes, Box Hill (AU); Peter Westhorp, Box Hill (AU); Peter Allfrey, Box Hill (AU); Eddie Sholl, Box Hill (AU)

(73) Assignee: Flexera Software LLC, Itasca, IL (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/799,007

(22) Filed: Oct. 31, 2017

(65) Prior Publication Data
US 2018/0054528 A1     Feb. 22, 2018

Related U.S. Application Data (63) Continuation of application No. 14/736,153, filed on Jun. 10, 2015, now Pat. No. 9,826,100.

(51) Int. Cl.
*H04L 29/06* (2006.01)
*H04M 15/00* (2006.01)
*H04W 4/24* (2018.01)

(52) U.S. Cl.
CPC .......... *H04M 15/00* (2013.01); *H04M 15/48* (2013.01); *H04M 15/58* (2013.01); *H04W 4/24* (2013.01); *H04L 63/08* (2013.01)

(58) Field of Classification Search
CPC ...... H04M 15/00; H04M 15/48; H04M 15/58; H04W 4/24
See application file for complete search history.

(56) References Cited

U.S. PATENT DOCUMENTS

| 9,137,131 | B1 * | 9/2015 | Sarukkai | H04L 43/0876 |
| 9,571,479 | B1 | 2/2017 | Sundaram et al. | |
| 2005/0183143 | A1 * | 8/2005 | Anderholm | G06F 11/32 726/22 |
| 2006/0026286 | A1 | 2/2006 | Lei et al. | |
| 2010/0228865 | A1 * | 9/2010 | Omshehe | G06F 21/105 709/227 |
| 2013/0151542 | A1 * | 6/2013 | Ben-Natan | H04L 69/22 707/755 |

(Continued)

Primary Examiner — Noura Zoubair
(74) Attorney, Agent, or Firm — Knobbe, Martens, Olson & Bear, LLP (57) ABSTRACT Various of the disclosed embodiments concern computer systems, methods, and programs for brokering logins to software as a service (SaaS) applications and tracking usage of the SaaS applications. First, a user, e.g. employee of an enterprise, logs into a SaaS usage proxy using a first set of credentials. The first set of credentials is known by the user, e.g. preexisting credentials for an enterprise-wide authentication system. Once a SaaS application is selected by the user, the SaaS usage proxy logs into the SaaS application using a second set of credentials. However, the second set of login credentials is encrypted and not known by the user, which causes the SaaS application to be accessible only through the SaaS usage proxy. This allows the SaaS usage proxy to monitor all usage of the SaaS application, even if multiple network-accessible devices are used to log into the SaaS usage proxy.

13 Claims, 10 Drawing Sheets (56) References Cited

U.S. PATENT DOCUMENTS

2014/0331060 A1* 11/2014 Hayton .................. G06F 21/31
  713/186
2016/0267257 A1* 9/2016 Wisgo .................. G06F 21/105

* cited by examiner

| User | SaaS Application | Login | Password |
|---|---|---|---|
| John.Smith@Enterp... | Application A | mfj88dsd | q2wq9fhc |
| Paul.Johnson@Ente... | Application A | c3gdhsncj | r0pcyzy9 |
| Peter.Jones@Enterp... | Application A | tt6e6iurc | k05mc4mh |
| Peter.Williams@En... | Application A | nj88jsdhjs | rw4vrpxe |
| Unassigned | Application A | pq446qpg | wu6m1n3d |

| User | SaaS Application | Login | Password |
|---|---|---|---|
| Paul.Johnson@Ente... | Application A | mfj88dsd | q2wq9fhc |
| Paul.Johnson@Ente... | Application B | c3gdhsncj | r0pcyzy9 |
| Peter.Jones@Enterp... | Application A | tt6e6iurc | k05mc4mh |
| Peter.Jones@Enterp... | Application C | nj88jsdhjs | rw4vrpxe |
| John.Smith@Enterp... | | | |

USAGE TRACKING FOR SOFTWARE AS A SERVICE (SAAS) APPLICATIONS

CROSS REFERENCE TO RELATED APPLICATIONS

This application is a continuation of U.S. patent application Ser. No. 14/736,153 filed on Jun. 10, 2015, which is herein incorporated by reference in its entirety.

RELATED FIELD

Various embodiments relate generally to computing systems. More specifically, various embodiments relate to computing systems, methods, and programs for tracking usage of SaaS applications.

BACKGROUND

Software as a service (SaaS) is a software licensing and delivery model in which software is centrally hosted, e.g. on a database, and remotely accessed by one or more users. The software is typically accessed through a browser, web-based portal, desktop software, etc., presented on a network-accessible device. This delivery model has allowed companies to reduce information technology (IT) costs and software/hardware maintenance costs.

Because the centrally-hosted software requires an end-user be authenticated, e.g. have a valid username and login, license compliance is generally not a significant concern. Unauthorized end-users simply aren't allowed access to the software.

Historically, organizations and enterprises have struggled to accurately measure software usage. In some instances, a monitoring plugin was installed on the web browser used by the end-user to access the software. But end-users now often connect to the centrally-hosted software using some combination of a desktop, laptop, tablet, cellular telephone, etc. It is impractical, if not impossible, to install and track monitoring plugins installed on each of these devices. Moreover, it is difficult to efficiently and effectively consolidate monitoring reports generated by monitoring plugins installed on a variety of distinct devices.

SUMMARY

Introduced herein are systems and methods for tracking usage of SaaS applications. Various monitoring systems described herein allow a user to log into a SaaS usage proxy using a first set of known credentials. The user may be, for example, an employee of an enterprise that wishes to track usage of SaaS applications it owns or licenses. Typically, the first set of known credentials is preexisting and used for an established enterprise-wide authentication system.

Once the first set of known credentials is validated by the SaaS usage proxy, the user can select a SaaS application previously acquired by the enterprise. The SaaS usage proxy is configured to log into the SaaS application using a second set of encrypted credentials. But the second set of encrypted credentials is not known by the user and, consequently, the SaaS application is accessible only through the SaaS usage proxy. This allows the SaaS usage proxy to monitor all usage of the SaaS application, even if the user logs into the SaaS usage proxy from various distinct network-accessible devices. Thus, a set of known credentials is input by the user to access the SaaS usage proxy, while a set of unknown credentials is input by the SaaS usage proxy to access the SaaS application.

In some embodiments, the SaaS usage proxy establishes a communication channel or "link" directly between a host storage, in which the SaaS application is stored, and the network-accessible device used to log into the SaaS usage proxy. The SaaS usage proxy may "step aside" once the second set of encrypted credentials is validated by the SaaS application. However, in other embodiments the SaaS usage proxy continues to act as a proxy and relate communications between the host storage and the network-accessible device. The host storage, e.g. server, may also include the SaaS usage proxy, a mapping table of encrypted credentials, or both.

DETAILED DESCRIPTION

Various embodiments are described herein that relate to mechanisms for tracking SaaS usage. More specifically, various embodiments relate to computer systems, methods, and programs that broker logins to SaaS applications and track usage of the SaaS applications. The users of the SaaS applications may be, for example, employees of an enterprise.

Figure 1:
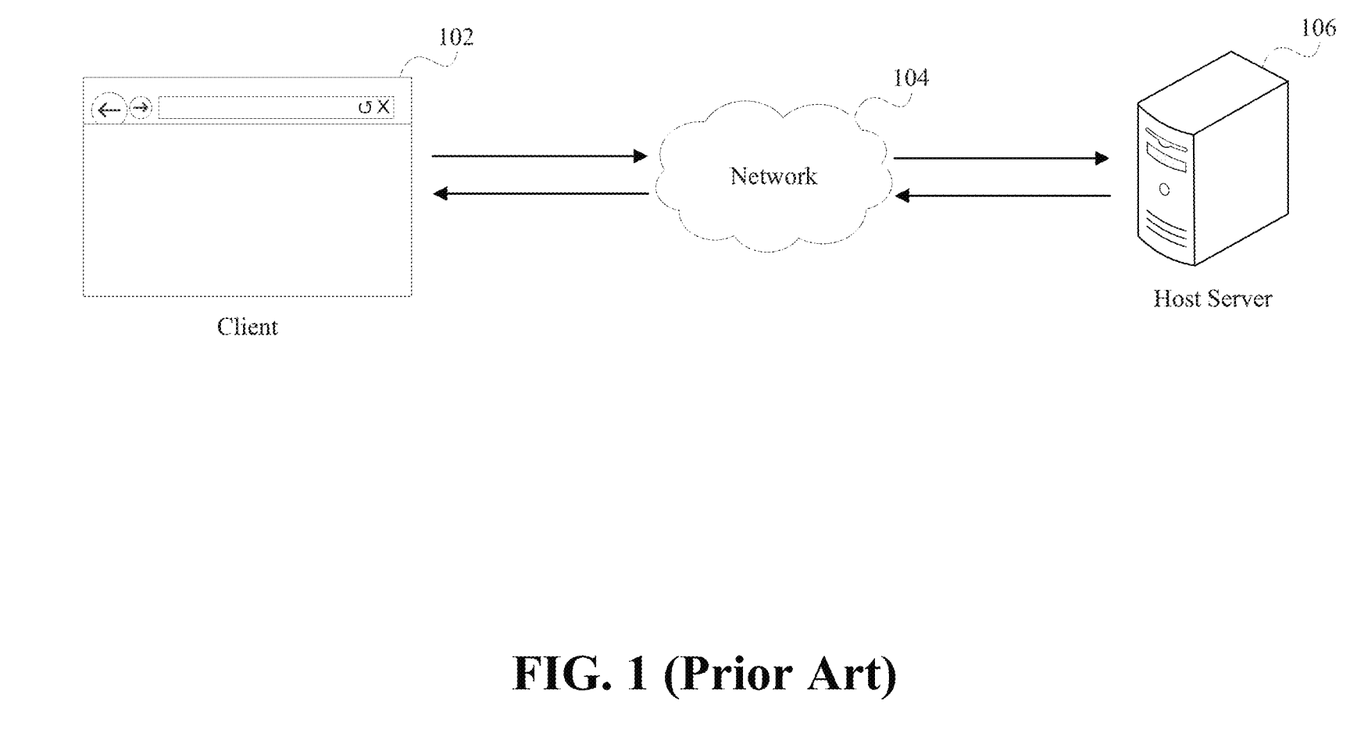
FIG. 1 is a system-level diagram of a SaaS distribution model as may traditionally occur.

FIG. 1 is a system-level diagram of a SaaS distribution model as may traditionally occur. SaaS is a software licensing and distribution model in which applications or programs are centrally hosted, e.g. on a host server 106. SaaS applications are often licensed on a subscription basis based on the total number of users, total usage, etc. Typically, a user accesses the SaaS applications by logging in through a browser, web-based portal, desktop software, etc., which are collectively referred to as a "client." In short, the user is able to remotely access and utilize a SaaS application by forming a connection between the client 102 and the host server 106 over a network 104. Oftentimes, clients 102 have various degrees of "thinness" or "thickness." The degree of thinness or thickness describes how a workload is distributed between the client 102 and the host server 106. For example, "thin client" may be used to refer to a browser-only architecture, while "thick client" can be used to describe a non-browser native-code application or utility. Other examples include a browser plus JavaScript® script, browser plus native-code browser plugin or extension, etc.

Figure 2A:
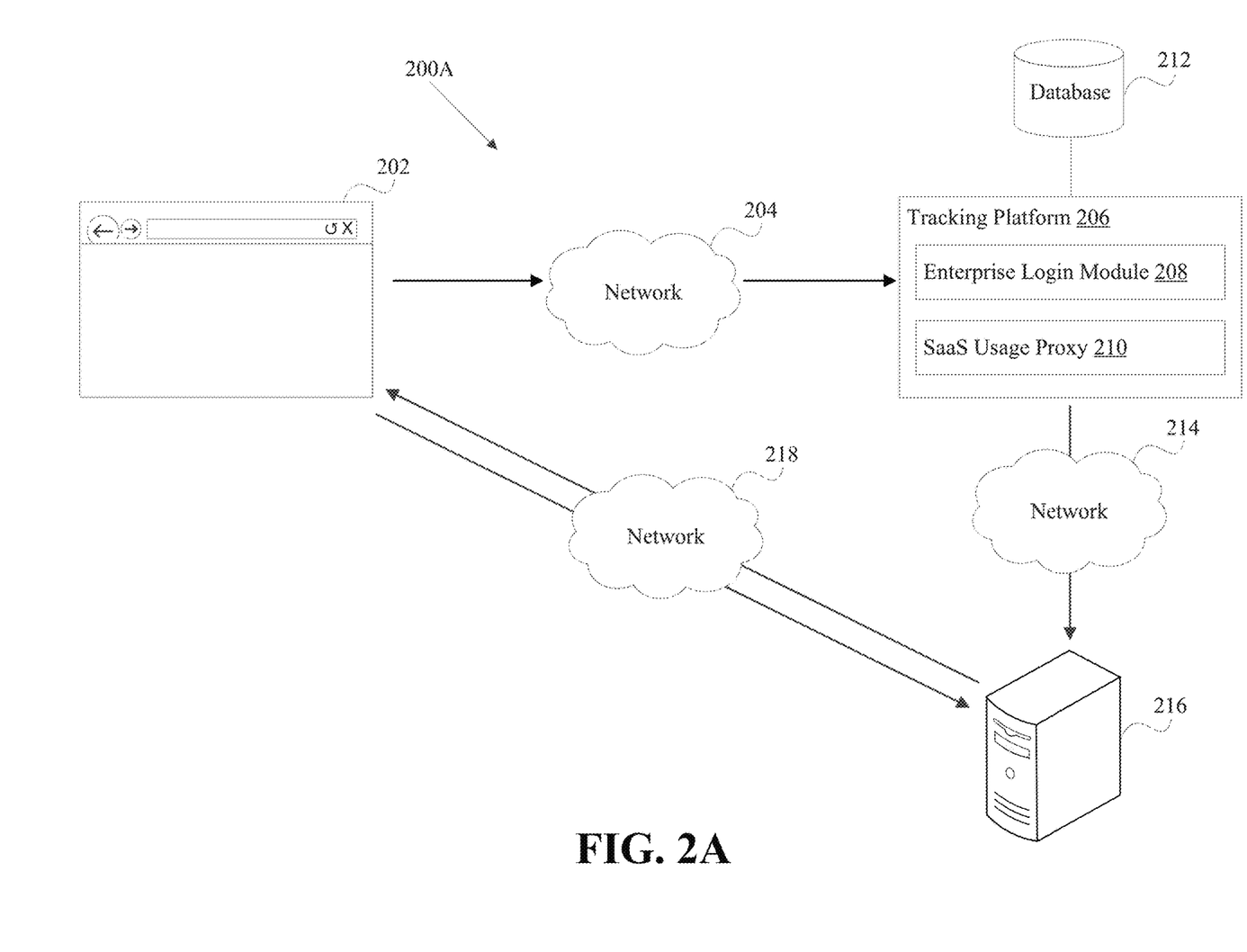
FIGS. 2A-B are system-level diagrams of SaaS usage tracking systems according to various embodiments.
Figure 2B:
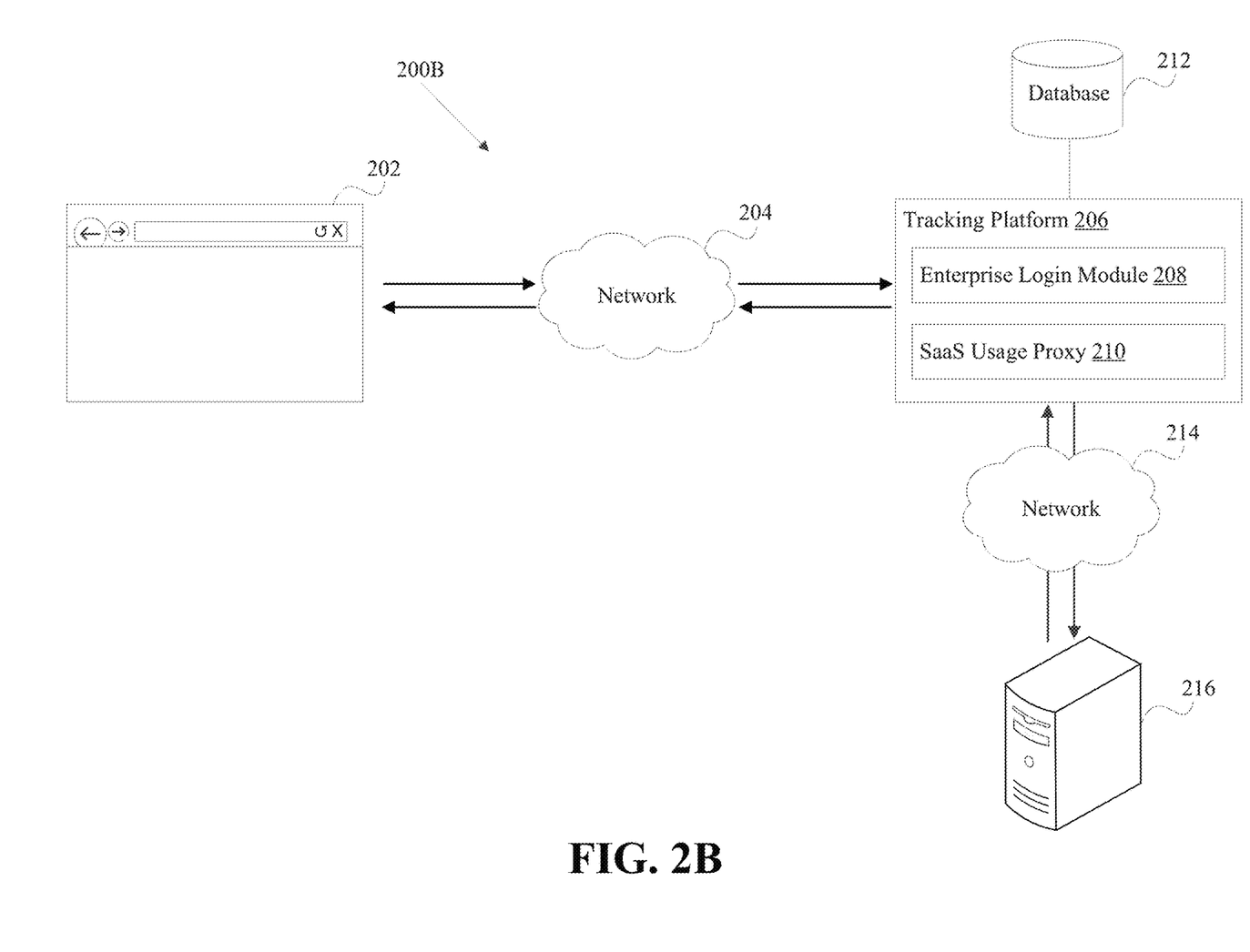

FIGS. 2A-B are system-level diagrams of SaaS usage tracking systems 200a-b according to various embodiments. The SaaS usage tracking systems 200a-b described herein allow for complete monitoring of all usage of one or more SaaS applications. For example, an enterprise may wish to track all usage of a SaaS application purchased for, and used by, its employees.

According to various embodiments, a user logs into a SaaS usage proxy 210, which may be part of a tracking platform 206, by entering a first set of login credentials into a client 202. The first set of login credentials are known by the user. For example, the first set of login credentials may be preexisting credentials used to log into other programs, applications, etc., hosted by the enterprise. That is, the SaaS usage tracking system 200a can be built on top of an enterprise's established authentication system, e.g. Active Directory for Microsoft Windows® environments. Once entered, the first set of login credentials can be analyzed and validated by an enterprise login module 208. The enterprise login module 208 may also be configured to identify which SaaS applications, if any, the user associated with the first set of login credentials is authorized to access.

The tracking platform 206 may include one or more storage modules or be communicatively coupled to a database 212 that includes the name and connection details for one or more SaaS applications, encrypted login credentials for the SaaS application(s), instructions regarding how to use the encrypted login credentials, etc. If the user chooses to initiate a SaaS application, the SaaS usage proxy 210 determines whether a second set of login credentials exist for the SaaS application that are associated with the first set of login credentials used to access the SaaS usage proxy. The second set of login credentials are encrypted and are not known by the user. Therefore, a set of known credentials is input by the user to access the SaaS usage proxy 210, while a set of unknown credentials is input by the SaaS usage proxy 210 to access the SaaS application stored on a host server 216. Because the second set of login credentials is encrypted and not known by the user, the SaaS application is accessible only through the SaaS usage proxy 210. Consequently, all usage of the SaaS application can be accurately monitored.

In other embodiments, encrypted login credentials for a SaaS application may not be specifically allocated to a single user. More specifically, the encrypted credentials may only be temporarily associated with a particular end user. For example, an end user may request access to the SaaS application via the SaaS usage proxy 210 and be automatically granted access in some instances, e.g. spare licenses are available and enterprise policy is to grant a license to any requestor. Once the end user finishes using the SaaS application, the encrypted credentials may be made available for subsequent end users. As another example, a request by an end user to use a SaaS application may initiate an approval process within the enterprise. The approval process could prompt the enterprise to acquire an additional license for the end user or allocate a spare set of encrypted login credentials to the end user. If the enterprise approves the request, the end user is allowed to use the SaaS application. However, the encrypted credentials may once again be made available once the end user finishes using the SaaS application.

In some embodiments, the client 202, tracking platform 206, and host server 216 communicate with one another over one or more networks 204, 214, 218, such as the Internet, a local area network (LAN), a wide area network (WAN), a point-to-point dial-up connection, etc. FIG. 2A illustrates the tracking platform 206 as being distinct from the client 202 and the host server 216. However, the tracking platform 206 could be located on the host server 216 or on a network-accessible device on which the client 202 is presented.

In some embodiments, a communication channel or "link" is established directly between the host server 216 and the network-accessible device used by the user to access the client 202. In such instances, the tracking platform 206 "steps aside" once the second set of login credentials is validated and the link is established, as shown in FIG. 2A. However, in other embodiments the tracking platform 206 continues to operate as a proxy and relays data, commands, etc., between the client 202 and the host server 216, as shown in FIG. 2B.

Figure 3:
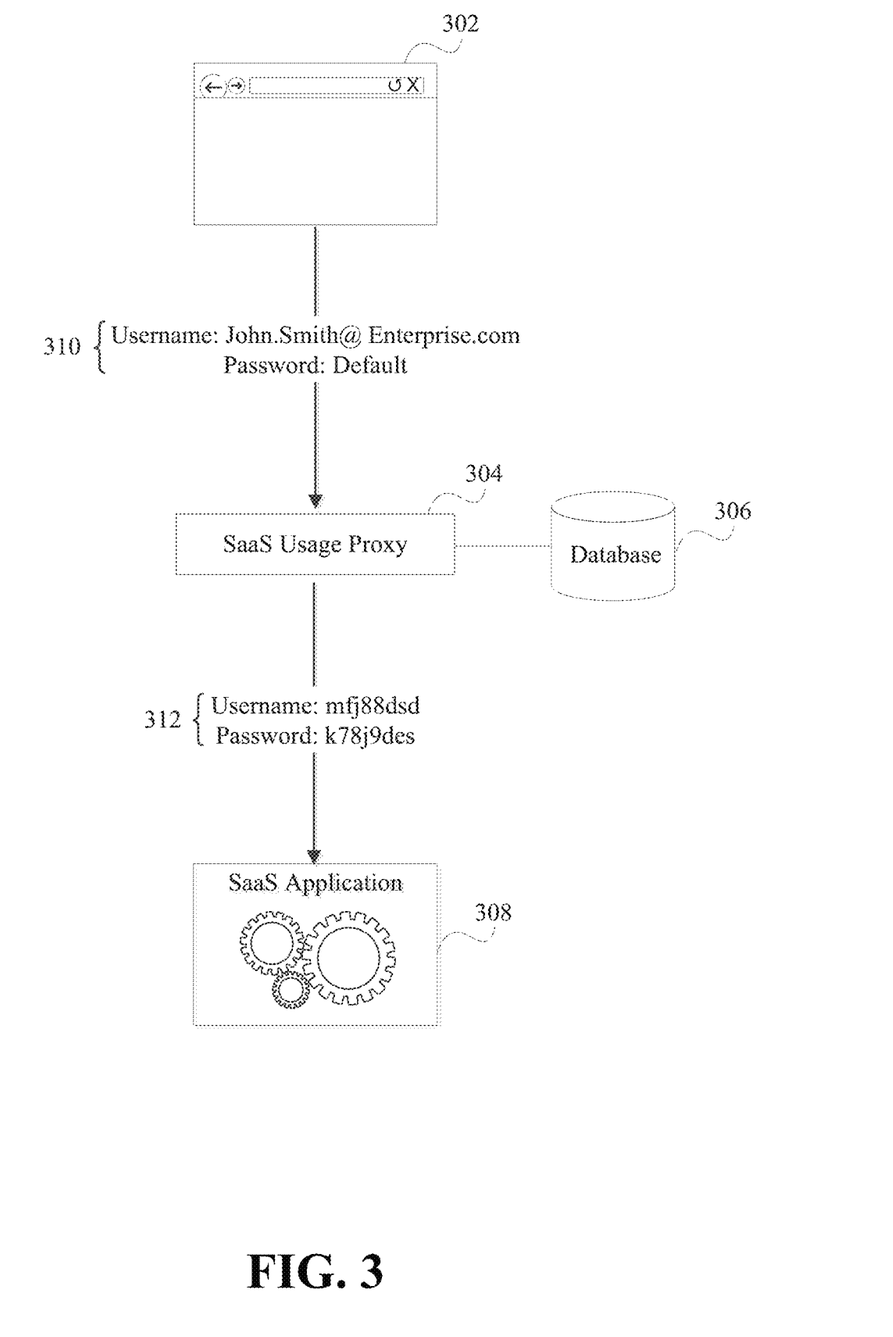
FIG. 3 is a diagrammatic illustration of an authentication process for initiating a SaaS application according to some embodiments.

FIG. 3 is a diagrammatic illustration of an authentication process for initiating a SaaS application according to some embodiments. First, a user can log into a SaaS usage proxy 304 by entering known credentials 310 into a client 302. As described above, the known credentials 310 may also be used to access other services, programs, etc., supported by an enterprise, of which the user is an employee. In some instances, the client 302 is personalized for the user, enterprise, or SaaS application.

Second, the SaaS usage proxy 304 can retrieve encrypted credentials 312 from storage, e.g. database 306. The encrypted credentials 312 are associated with or "mapped to" the known credentials 310, rather than a particular network-accessible device. This allows the SaaS usage proxy 304 to monitor usage of the SaaS application 308 regardless of the network-accessible device used to access the client 302. Third, the SaaS usage proxy 304 can log into the SaaS application 308 by entering the encrypted credentials 312, which remain unknown to the user. The multi-step authentication process ensures that users can access the SaaS application 308 only through the SaaS usage proxy 304.

Figure 4:
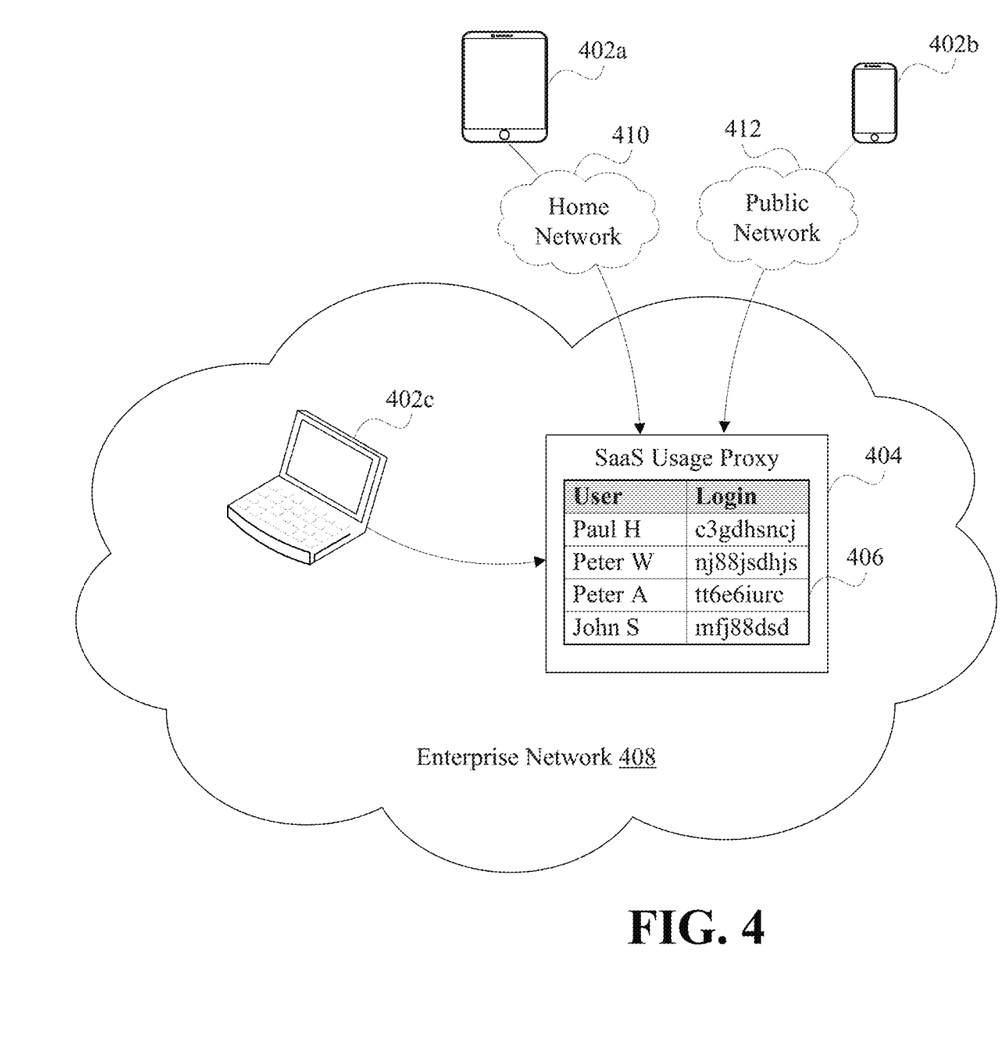
FIG. 4 is a diagrammatic view of various network-accessible devices used by a single user to access a SaaS application as may occur in some embodiments.

FIG. 4 is a diagrammatic view of various network-accessible devices 402a-c used by a single user to access a SaaS application as may occur in some embodiments. Each of the user devices 402a-c logs into the SaaS usage proxy 404 according to the authentication process described above with respect to FIG. 3. The SaaS usage proxy 404 of FIG. 4 is managed by an enterprise and hosted within a private network 408 belonging to the enterprise. However, in other embodiments the SaaS usage proxy 404 is managed by another entity, hosted on a different, i.e. non-enterprise, network, or both.

Regardless of the location of or network used by the network-accessible devices 402a-c, the user logs into the SaaS usage proxy 404 using the same set of known login credentials. For example, the user can log into the SaaS usage proxy 404 through a home network 410 using a tablet 402a, through a public network 412 using a cellular telephone 402b, through the enterprise network 408 using a laptop 402c, etc.

Once logged into the SaaS usage proxy 404, the user can elect to initiate a SaaS application and the SaaS usage proxy 404 can retrieve encrypted login credentials from a mapping table 406. The mapping table 406, which can also be referred to as a lookup table, can be stored locally, i.e. on the same computing device, or remotely with respect to the SaaS usage proxy 404. More specifically, the mapping table 406 could be stored on the same computing system. e.g. server, as the SaaS usage proxy 404 or a distinct computing system. Each valid user is typically associated with, at most, a single set of encrypted login credentials for a SaaS application. However, a valid user could be associated with multiple sets of encrypted login credentials for the SaaS application in some embodiments. For example, a first set of credentials granting certain permissions, e.g. read-only, and a second set of credentials granting different permissions, e.g. read/write/execute. A single valid user, meanwhile, could be associated with encrypted login credentials for more than one SaaS application. These encrypted login credentials are monitored to accurately track all SaaS application usage, regardless of which network-accessible devices 402a-c was used to access the SaaS usage proxy 404.

The SaaS usage proxy 404 is able acquire and analyze various types of information that can be used to determine usage. For example, in some embodiments the SaaS usage proxy 404 identifies the uniform resource locators (URLs) accessed by the user through the SaaS application, while in other embodiments the SaaS usage proxy 404 monitors time, e.g. login time, logout time. Hypertext Transfer Protocol (HTTP) parameters, e.g. header field content, etc. The SaaS usage proxy 404 could be configured to track some, all, or none of these metrics. Collection of various types of information allows the SaaS usage proxy 404 to qualify the nature of the usage, as well as quantify the amount of usage.

Figure 5A:
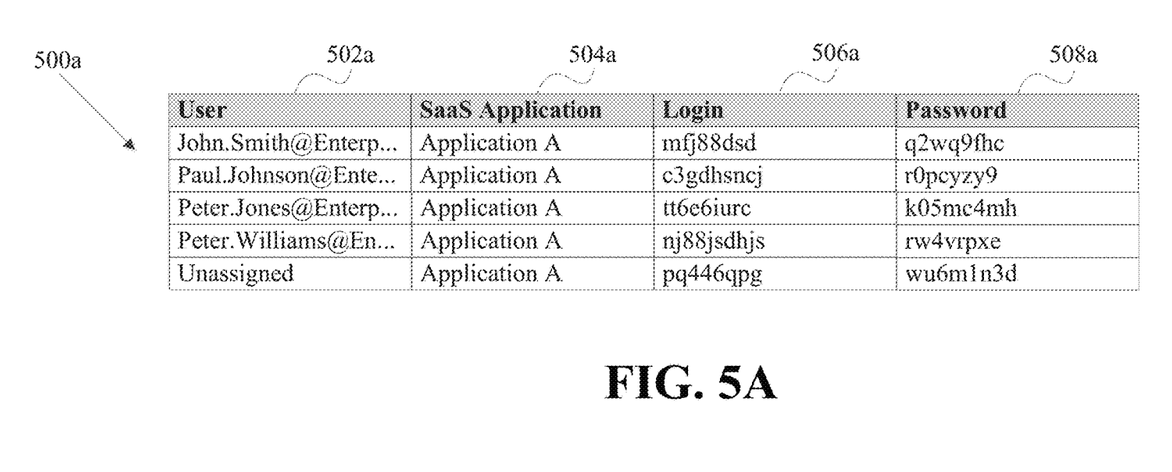
FIGS. 5A-B are examples of mapping tables as may be generated by a SaaS usage proxy in accordance with various embodiments.
Figure 5B:
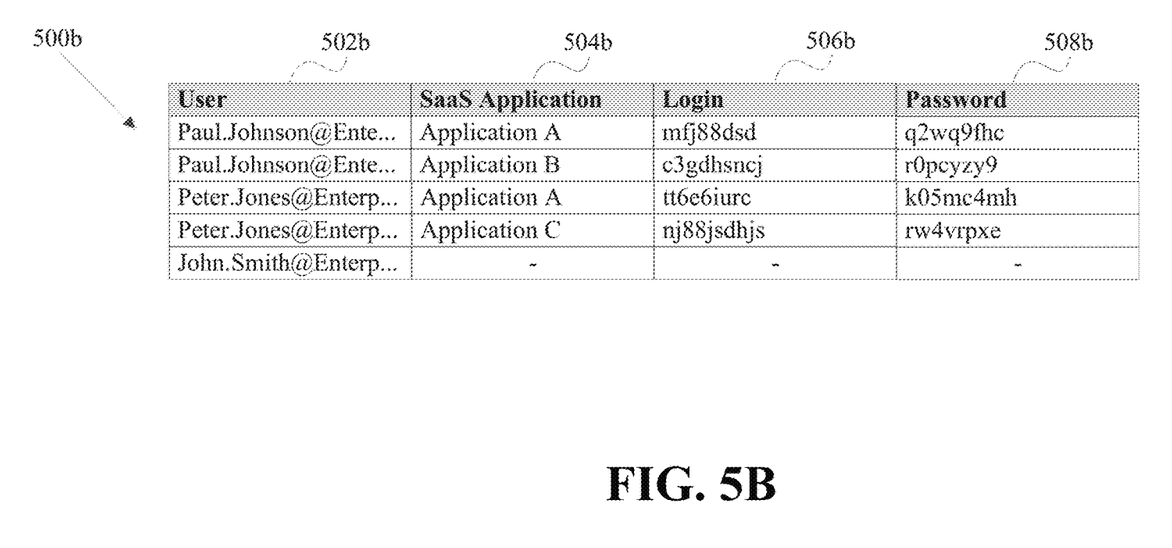

FIGS. 5A-B are examples of mapping tables 500a-b as may be generated by a SaaS usage proxy in accordance with various embodiments. When an enterprise acquires a new SaaS application, the SaaS usage proxy can create randomly-generated credentials that can be used to initiate the SaaS application. Typically, the randomly-generated credentials, which include a login 506a-b and a password 508a-b, are stored in an encrypted form. The mapping table 500a-b associates valid enterprise accounts 502a-b with randomly-generated credentials. Usage of the SaaS application is therefore attributed to an enterprise account 502a-b and is entirely independent of the network-accessible device used to access the SaaS usage proxy and initiate the SaaS application.

In some embodiments, the SaaS usage proxy randomly generates a predetermined number of encrypted credentials for a particular SaaS application. Some or all of the predetermined number of encrypted credentials may be assigned to enterprise user accounts 502a-b. In some instances, encrypted credentials may remain unassigned until needed by an enterprise user, as shown in FIG. 5A. The predetermined number, meanwhile, may be established by an administrator of the tracking system who also identifies which enterprise users are permitted to use the SaaS application.

In other embodiments, encrypted credentials are generated only when needed. e.g. when a user is granted authorization by an administrator to use a SaaS application. For example, mapping table 500b of FIG. 5B includes an entry for each enterprise user, even those enterprise users who are not permitted to access any SaaS applications. Mapping tables 500a-b may include encrypted login credentials for one or more SaaS applications. For example, mapping table 500a includes encrypted credentials for a single SaaS application, while mapping table 500b includes encrypted credentials for a plurality of SaaS applications.

The SaaS usage proxy can also be communicatively coupled to a storage medium. e.g. database 306 of FIG. 3, that includes instructions regarding how to log into each SaaS application acquired by the enterprise. In some embodiments, the instructions and mapping table 500a-b are stored in the same storage medium and the instructions are linked to specific entries in the mapping table 500a-b. For example, mapping table 500b is linked to multiple sets of instructions that indicate how the encrypted credentials are to be applied to the various SaaS applications 504b. The instructions could involve pointing the SaaS usage proxy to where the login and password fields are located, whether confirmation of the credentials is necessary, etc. These instructions can be implemented in various ways. For example, if the SaaS application 504b contains a supported application programming interface (API) for logging in, the instructions may include details on how to interact or "talk" with the API. Oftentimes, an administrator inputs the instructions that allow the SaaS usage proxy to correctly log into the SaaS application. As another example, the SaaS usage proxy may be trained, e.g. by the administrator, to identify appropriate steps for logging in.

Figure 6:
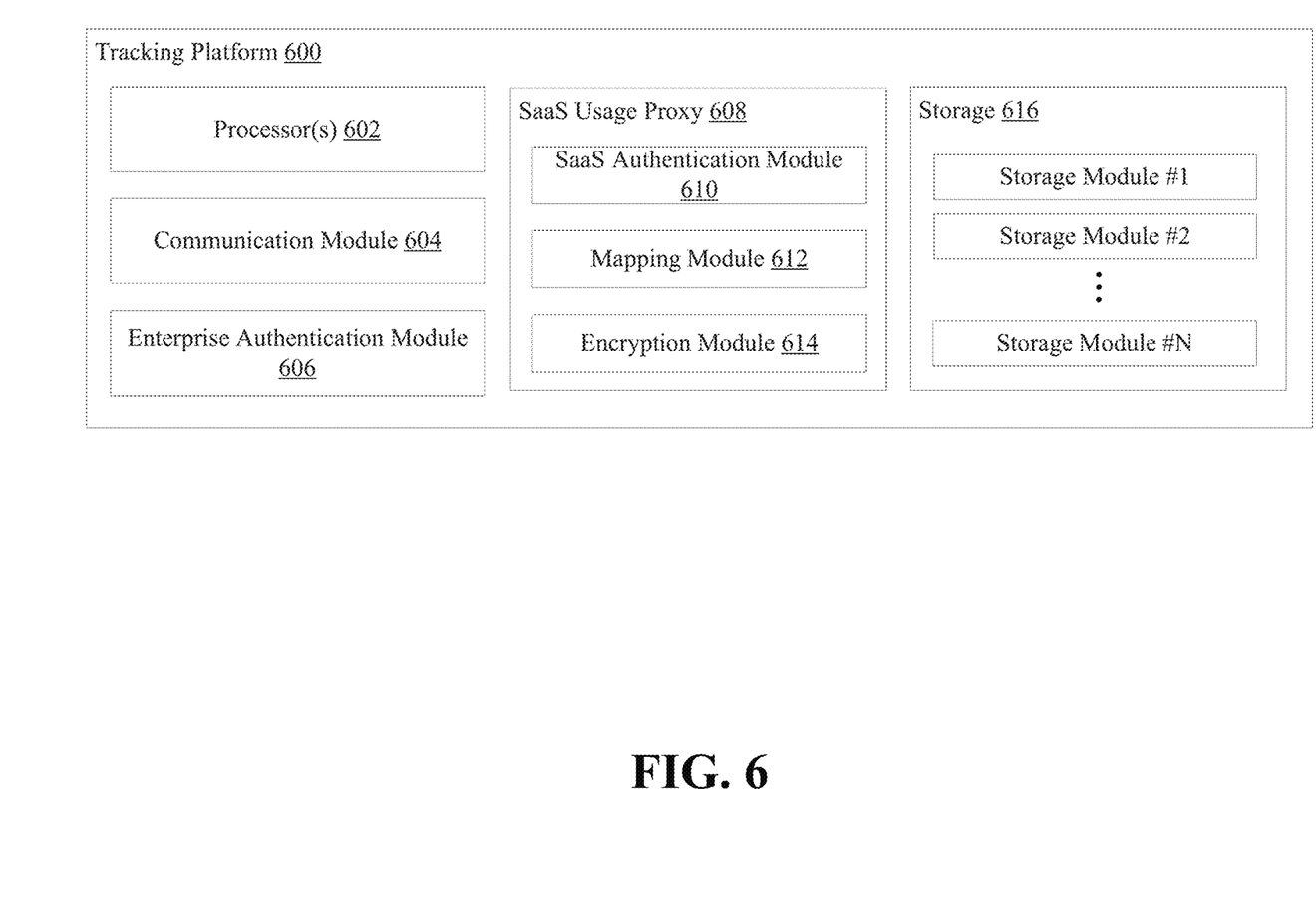
FIG. 6 is a block diagram depicting exemplary components of a tracking platform for monitoring usage of a SaaS application as may occur in some embodiments.

FIG. 6 is a block diagram depicting exemplary components of a tracking platform 600 for monitoring usage of a SaaS application as may occur in some embodiments. The tracking platform 600 can include one or more processors 602, a communication module 604, an enterprise authentication module 606, a SaaS usage proxy 608, a SaaS authentication module 610, a mapping module 612, an encryption module 614, and one or more storage modules 616. Other embodiments of the tracking platform 600 may include some, all, or none of these modules and components, along with other modules and/or components. Some embodiments may incorporate two or more of these modules into a single module and/or associate a portion of the functionality of one or more of these modules with a different module.

Storage 616 can be any device or mechanism used for storing information. In various embodiments, storage 616 includes instructions for running one or more of the modules on the one or more processors 602. For example, storage 616 may house all or some of the instructions needed to execute the functionality of the enterprise authentication module 606. SaaS usage proxy 608, etc. The storage 616 may also house a mapped database of encrypted login credentials, instructions regarding how to use the encrypted login credentials, one or more SaaS applications, etc. The SaaS applications are typically configured to be agnostic to client structure, e.g. browser type, operating system. However, in some instances the storage 616 may include a mapping of supported client structure(s) for a SaaS application.

The communication module 604 manages communication between components and modules of the tracking platform 600 and/or other computing devices, such as network-accessible devices 402a-c of FIG. 4 and host server 216 of FIGS. 2A-B. Thus, the communication module 604 can establish connection links and facilitate the exchange of information between the client and the SaaS application.

The enterprise authentication module 606 validates login credentials entered by the user on a client. These login credentials are known by the user and, as described above, may be preexisting credentials also used for an enterprise's established authentication system. In some embodiments, the enterprise authentication module 606 or another module, e.g. GUI module, is configured to generate the client that is used to log into the tracking platform 600 and/or SaaS usage proxy 608.

The SaaS usage proxy 608 manages various aspects of the authentication process through which the user initiates a SaaS application. For example, the SaaS usage proxy 608 can randomly generate login credentials for the SaaS application once acquired by an enterprise. The SaaS usage proxy 608, a mapping module 612, or an administrator then assigns the randomly-generated login credentials to one or more users, e.g. employees of the enterprise. In some embodiments, the mapping module 612 generates a mapping table in which randomly-generated login credentials are mapped to enterprise user accounts. An encryption module 614 can encrypt the randomly-generated login credentials such that they remain unknown to the user(s) to whom the credentials are assigned.

Consequently, a user is able to log into the SaaS usage proxy 608 and initiate a SaaS application despite only knowing one set of login credentials. The second encrypted set of login credentials is input by the SaaS usage proxy 608 when a valid user elects to initiate a SaaS application. Because the login credentials needed to initiate the SaaS application are encrypted and not known by the user, the SaaS usage proxy 608 is able to monitor all usage of the SaaS application.

In some embodiments, the SaaS usage proxy 608 establishes a virtual URL that directs the user to the SaaS application via the SaaS usage proxy 608. While the virtual URL is completely transparent to the user, the target URL may be obfuscated. For example, a user could enter "http://SaaSapplication.mycompany.com" and then be logged into "http://SaaSapplication.com" using the encrypted credentials generated by the SaaS usage proxy 608. Here, "http://SaaSapplication.com" represents the SaaS application.

The tracking platform 600 could also include modules, components, or applications that monitor latency, implement host server mirroring to create a tolerant and redundant SaaS infrastructure, perform load balancing across a plurality of host servers, etc.

Figure 7:
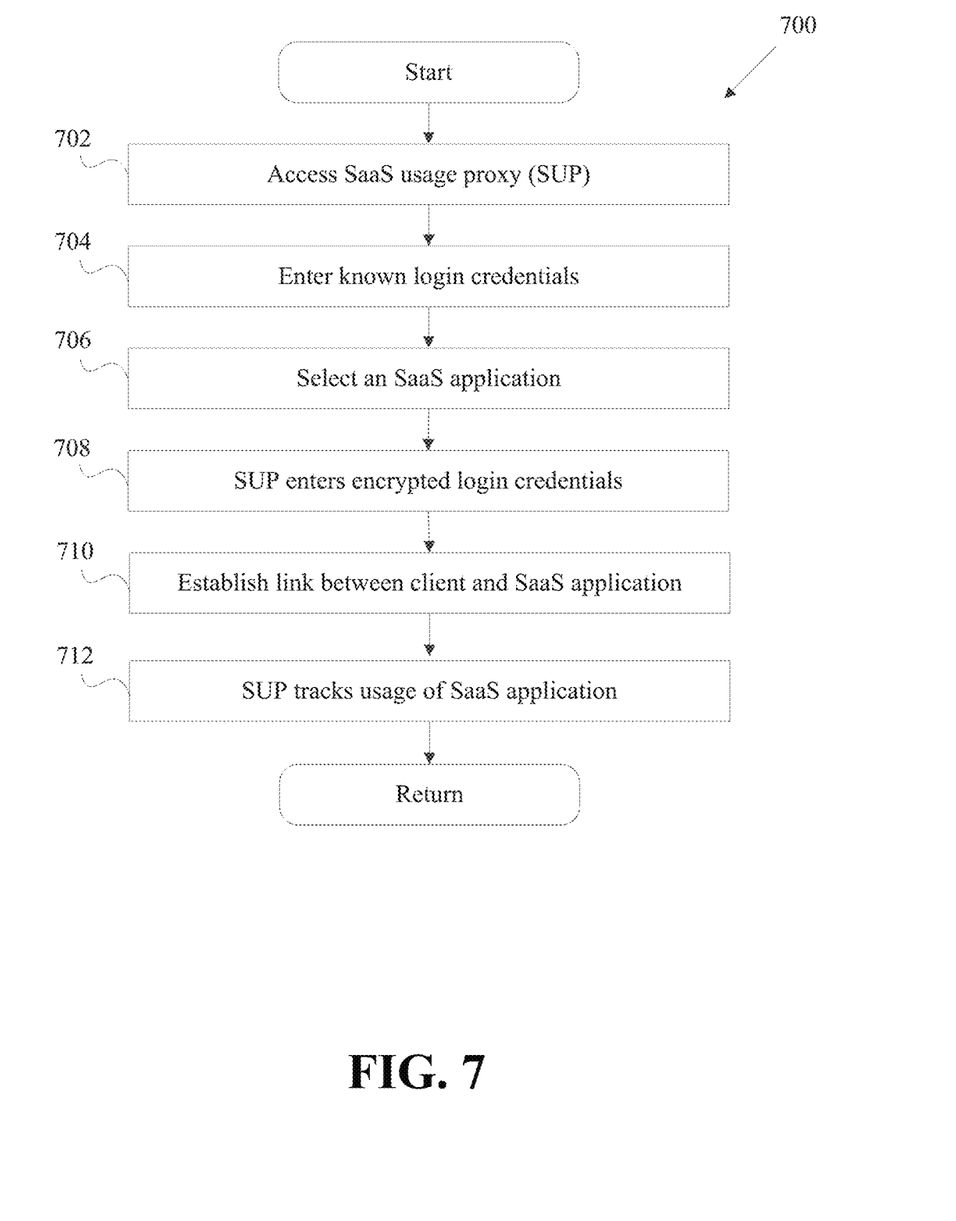
FIG. 7 is a flow diagram illustrating a process for initiating a SaaS application through a SaaS usage proxy as may occur in various embodiments.

FIG. 7 is a flow diagram illustrating a process 700 for initiating a SaaS application through a SaaS usage proxy as may occur in various embodiments. At block 702, a user accesses a SaaS usage proxy that brokers logins to a SaaS application. Typically, the SaaS usage proxy includes, or has access to, specific instructions provided by an administrator regarding how to log into the SaaS application. At block 704, the user enters a first set of login credentials into a client. The first set of login credentials is known by the user. Once the first set of login credentials is authenticated by the SaaS usage proxy, the user can select a SaaS application, as shown at block 706. Proper authentication may require the SaaS usage proxy confirm the user has a valid user account with the enterprise that acquired the SaaS application. At block 708, the SaaS usage proxy facilitates the login to the SaaS application by entering a second set of login credentials previously generated by the SaaS usage proxy. The second set of login credentials are encrypted and allocated to a particular user. More specifically, the second set of login credentials is associated with the first set of login credentials.

At block 710, a communication link is established between the client and the SaaS application. In some embodiments, the link is established directly between the computing device, e.g. host server, hosting the SaaS application and the network-accessible device. e.g. computer, tablet, cellular telephone, used to interact with the client. In other embodiments, the link continues to be directed through the SaaS usage proxy. That is, the SaaS usage proxy may continue to act as a proxy between the client and the SaaS application. Such a configuration may allow the SaaS usage proxy to monitor additional metrics that can be used to qualify or quantify usage of the SaaS application. Once the link has been established, the user can begin using the SaaS application through the client and the SaaS usage proxy can monitor usage of the SaaS application, as shown at block 712.

Figure 8:
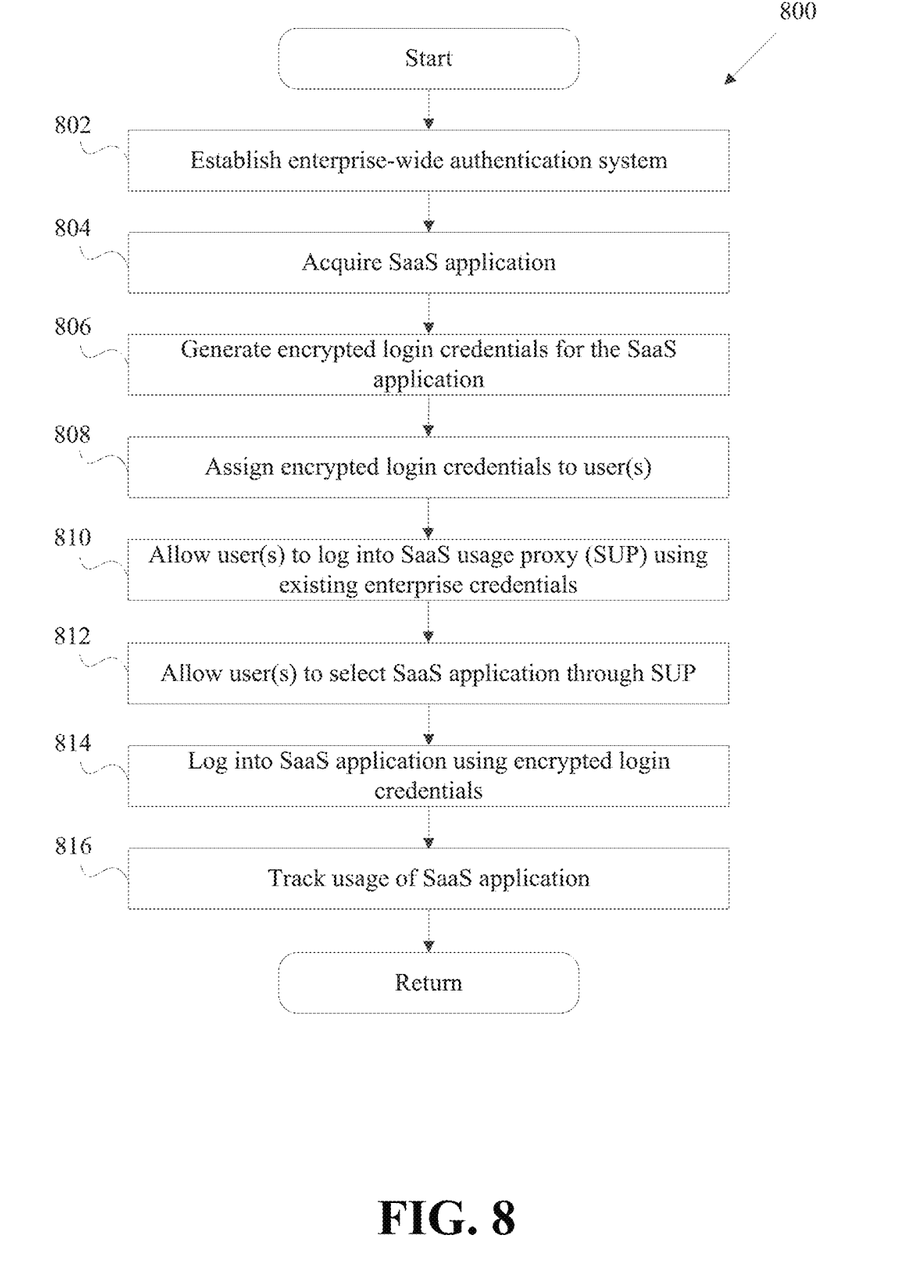
FIG. 8 is a flow diagram illustrating a process for establishing a SaaS usage tracking system as may occur in some embodiments.

FIG. 8 is a flow diagram illustrating a process 800 for establishing a SaaS usage tracking system as may occur in some embodiments. At block 802, a business organization establishes an enterprise-wide authentication system, e.g. Active Directory for Microsoft Windows® environments. The enterprise-wide authentication system generates valid login credentials. e.g. username and password, for some or all of the user accounts associated with the organization. At block 804, the organization acquires a SaaS application. Specific instructions can be input by an administrator regarding how a SaaS usage proxy should log into the SaaS application.

At block 806, the SaaS usage proxy generates encrypted login credentials for the SaaS application. Unlike the enterprise login credentials, the encrypted login credentials are not known by the user. At block 808, some or all of the encrypted login credentials are assigned to valid users. More specifically, each set of encrypted login credentials can be assigned to a particular user, i.e. associated with of the particular user's enterprise login credentials. At block 810, the user is able to log into the SaaS usage proxy using the enterprise login credentials. The SaaS usage proxy can authenticate the user and confirm the user is a valid end-user, e.g. employee, associated with the organization.

The SaaS usage proxy then allows the user to select a SaaS application to be launched, as shown at block 812. The SaaS usage proxy can ensure the user has a valid enterprise account that is permitted to use the SaaS application and, at block 814, can log into the SaaS application using the encrypted login credentials associated with the user's enterprise login credentials. At block 816, the SaaS usage proxy tracks usage of the SaaS application by the user. As described above, the SaaS usage proxy may be configured to monitor URLs accessed by the user, time, e.g. login time, logout time, Hypertext Transfer Protocol (HTTP) parameters. e.g. header field content, etc.

Figure 9:
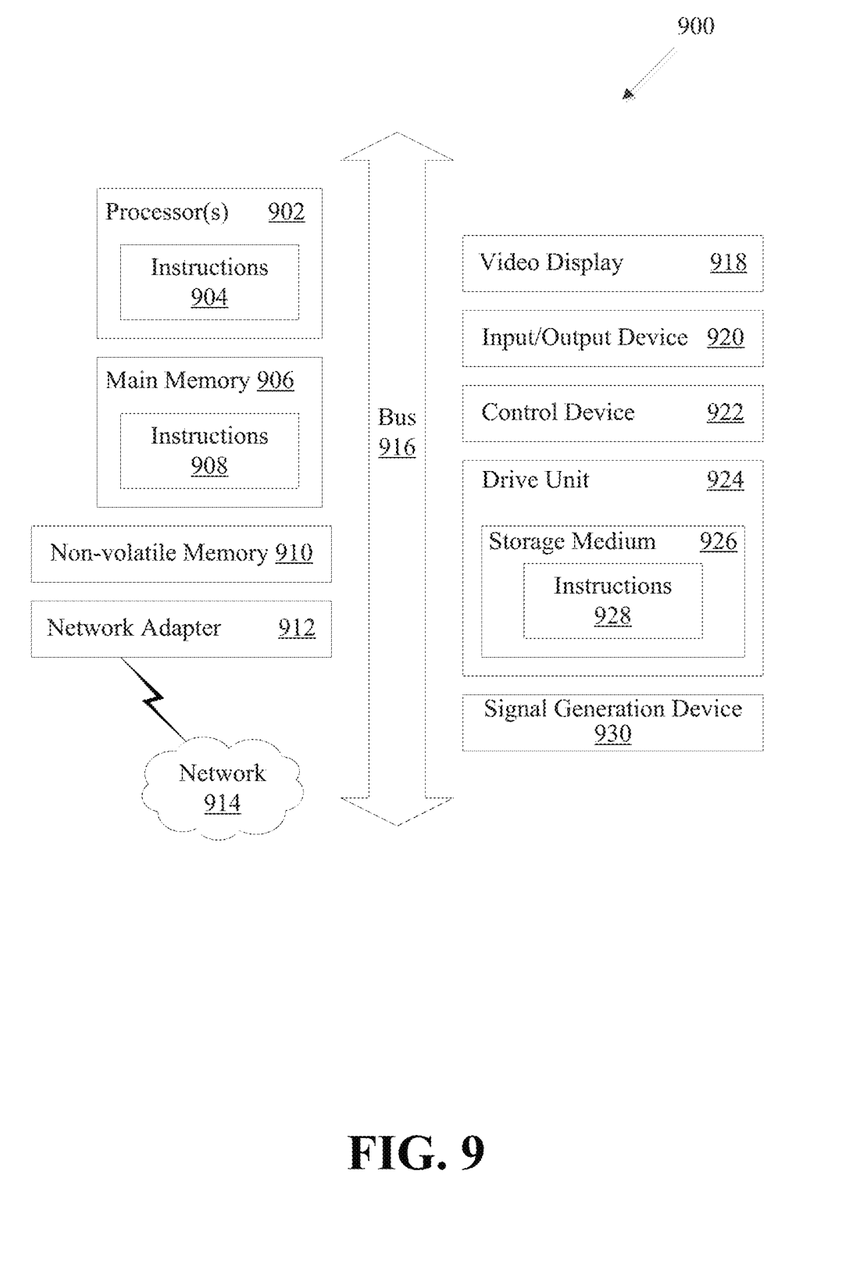
FIG. 9 is a block diagram illustrating an example of a computer system in which at least some of the operations described herein can be implemented.

FIG. 9 is a block diagram illustrating an example of a computer system 900 in which at least some of the operations described herein can be implemented. The computer system 900 may include one or more central processing units ("processors") 902, main memory 906, non-volatile memory 910, network adapter 912. e.g. network interfaces, video display 918, input/output devices 920, control device 922, e.g. keyboard and pointing devices, drive unit 924 including a storage medium 926, and signal generation device 930 that are communicatively connected to a bus 916.

The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a USB, IIC (I2C) bus, or an Institute of Electrical and Electronics Engineers (IEEE) standard 1394 bus, also called "Firewire."

The computer system 900 may be a server computer, a client computer, a personal computer (PC), a user device, a tablet PC, a laptop computer, a personal digital assistant (PDA), a cellular telephone, an Android, an iPhone, an iPad, a Blackberry, a processor, a telephone, a web appliance, a network router, switch or bridge, a console, a hand-held console, a (hand-held) gaming device, a music player, any portable/mobile hand-held device, wearable device, or any machine capable of executing a set of instructions, sequential or otherwise, that specify actions to be taken by that machine.

The main memory 906, non-volatile memory 910, and storage medium 926 are computer-readable storage media that may store instructions 904, 908, 928 that implement at least portions of various embodiments. The instructions 904, 908, 928 can be implemented as software and/or firmware to program processor(s) 902 to carry out the actions described above.

The network adapter 912 enables the computer system 900 to mediate data in a network 914 with an entity that is external to the computer device 900, through any known and/or convenient communications protocol. The network adapter 912 can include a network adaptor card, wireless network interface card, router, access point, wireless router, switch, multilayer switch, protocol converter, gateway, bridge, bridge router, hub, digital media receiver, and/or repeater.

The techniques introduced here can be implemented by, for example, programmable circuitry, e.g. one or more processors, programmed with software and/or firmware, entirely in special-purpose hardwired, i.e. non-programmable, circuitry, or in a combination of such forms. Special-purpose circuitry may be in the form of, for example, one or more application-specific integrated circuits (ASICs), programmable logic devices (PLDs), field-programmable gate arrays (FPGAs), etc.

The language used in the Detailed Description has been principally selected for readability and instructional purposes, and it may not have been selected to delineate or circumscribe the inventive subject matter. It is therefore intended that the scope of the technology be limited not by the Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A computer-implemented method, comprising:
   receiving, by a usage proxy, enterprise credentials supplied by a user via a client on an electronic device, the enterprise credentials corresponding to an enterprise account of a user;
   causing, by the usage proxy, the enterprise credentials to be authenticated by an authentication component associated with an enterprise, to thereby authenticate the user;
   determining, by the usage proxy, which of a set of software-as-a-service (SaaS) applications the user is authorized to access;
   receiving, by the usage proxy, a selection by the user of a SaaS application that the user is authorized to access, said selection made by the user after said authentication of the user;
   assigning, by the usage proxy, a pre-generated set of login credentials for the selected SaaS application to the user as a temporary assignment, said pre-generated set of login credentials comprising a login ID and password and being unknown to the user;
   by the usage proxy, logging into the selected SaaS application on behalf of the user using the assigned set of login credentials, without exposing the set of login credentials to the user, wherein the usage proxy, in logging into the selected SaaS application on behalf of the user, enters the login ID and password into login and password fields of the SaaS application based on instructions that specify, to the usage proxy, locations of said login and password fields;
   while the usage proxy is logged into the SaaS application on behalf of the user, monitoring, by the usage proxy, usage of the SaaS application by the user; and
   by the usage proxy, reassigning the pre-generated set of login credentials to a different user after the user finishes using the SaaS application.

2. The method of claim 1, wherein the pre-generated set of login credentials is randomly generated.

3. The method of claim 1, wherein the usage proxy, in logging into the selected SaaS application on behalf of the user, uses an application programming interface of the SaaS application to communicate with the SaaS application.

4. The method of claim 1, wherein the instructions are specific to the SaaS application.

5. The method of claim 1, wherein the usage proxy assigns the set of pre-generated login credentials for the selected SaaS application to the user in response to a request by the user to access the selected SaaS application.

6. A usage tracking system, comprising:
   non-transitory computer storage that stores mapping data that maps an enterprise account of a user to at least a plurality of SaaS applications the user is authorized to access; and
   a usage proxy comprising a hardware processor programmed with executable code, the usage proxy configured to at least:
   log the user into the enterprise account using enterprise login credentials supplied by the user, said enterprise login credentials being distinct from the login credentials for the SaaS applications;
   receive an indication of a selection made by the user of one of the SaaS applications, said selection made while the user is logged into the enterprise account;
   assign pre-generated login credentials for the selected SaaS application to the enterprise account of the user as a temporary assignment, said pre-generated login credentials comprising a login ID and password and being unknown to the user;
   log into the selected SaaS application on behalf of the user using the assigned login credentials for the selected SaaS application, wherein the usage proxy, in logging into the selected SaaS application on behalf of the user, enters the login ID and password into login and password fields of the SaaS application based on instructions that specify locations of said login and password fields; and
   while logged into the SaaS application on behalf of the user, track usage by the user of the SaaS application; and
   reassign the pre-generated set of login credentials to an enterprise account of a different user after the user finishes using the SaaS application.

7. The usage tracking system of claim 6, wherein the login ID and password are randomly generated values generated by the usage proxy.

8. The usage tracking system of claim 6, wherein the usage proxy, in logging into the selected SaaS application on behalf of the user, is configured to use an application programming interface of the SaaS application to communicate with the SaaS application.

9. The usage tracking system of claim 6, wherein the instructions are specific to the SaaS application.

10. The usage tracking system of claim 6, wherein the usage tracking system is configured to generate a plurality of sets of login credentials for the SaaS application, and to assign said sets of login credentials to respective enterprise accounts.

11. The usage tracking system of claim 6, wherein the usage proxy is configured to assign the pre-generated login credentials to the enterprise account of the user in response to a request by the user to access the selected SaaS application.

12. A computer-implemented method, comprising:
- receiving, by a usage proxy, enterprise credentials supplied by a user via a client on an electronic device, the enterprise credentials corresponding to an enterprise account of a user;
- causing, by the usage proxy, the enterprise credentials to be authenticated by an authentication component associated with an enterprise, to thereby authenticate the user;
- receiving, by the usage proxy, a selection by the user of a SaaS application, said selection made by the user after said authentication of the user;
- assigning to the user, as a temporary assignment, a pre-generated set of login credentials for the selected SaaS application, said set of login credentials comprising a login ID and password that are unknown to the user;
- by the usage proxy, logging into the selected SaaS application on behalf of the user using the assigned set of login credentials, without exposing the set of login credentials to the user, wherein logging into the selected SaaS application on behalf of the user comprises, by the usage proxy, locating login ID and password fields of the SaaS application based on instructions;
- while the usage proxy is logged into the SaaS application on behalf of the user, monitoring, by the usage proxy, usage of the SaaS application by the user; and
- by the usage proxy, reassigning the pre-generated set of login credentials to a different user after the user finishes using the SaaS application.

13. The method of claim 12, further comprising, by the usage proxy, generating the login ID and password using a random value generator, and storing the login ID and password in association with both an enterprise account identifier of the user and an identifier of the SaaS application.

* * * * *

UNITED STATES PATENT AND TRADEMARK OFFICE
CERTIFICATE OF CORRECTION

PATENT NO. : 10,992,818 B2
APPLICATION NO. : 15/799007
DATED : April 27, 2021
INVENTOR(S) : Paul Gerard Hughes Page 1 of 1

It is certified that error appears in the above-identified patent and that said Letters Patent is hereby corrected as shown below:

In the Specification

In Column 4, Line 67, delete "system." and insert --system,--.

In Column 5, Line 21, delete "time." and insert --time,--.

In Column 5, Line 52, delete "needed." and insert --needed,--.

In Column 5, Line 63, delete "medium." and insert --medium,--.

In Column 6, Line 37, delete "606." and insert --606,--.

In Column 7, Line 56, delete "device." and insert --device,--.

In Column 8, Line 7, delete "credentials." and insert --credentials,--.

In Column 8, Lines 35-36, delete "parameters." and insert --parameters,--.

In Column 8, Line 42, delete "912." and insert --912,--.

In the Claims

In Column 10, Line 46, Claim 6: after "fields;" delete "and".

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*